United States Patent
Chin et al.

(10) Patent No.: US 6,404,534 B1
(45) Date of Patent: Jun. 11, 2002

(54) MICRO-MIRROR DEVICE AND DRIVING METHOD

(75) Inventors: Dae-je Chin, Seoul; Hyung-jae Shin, Seongnam; Sang-hun Lee, Seoul, all of (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/698,138

(22) Filed: Oct. 30, 2000

(30) Foreign Application Priority Data

Oct. 29, 1999 (KR) .......................................... 99-47514

(51) Int. Cl.⁷ .......................... G02B 26/00; G02B 26/02
(52) U.S. Cl. ...................... 359/295; 359/291; 359/293; 359/224; 359/230; 359/254; 359/846; 348/771; 427/162
(58) Field of Search ................................ 359/223, 224, 359/230, 254, 290, 291, 292, 293, 295, 298, 846, 847, 848; 427/162, 255.6, 534; 348/771, 571; 347/239

(56) References Cited

U.S. PATENT DOCUMENTS

| | | | | |
|---|---|---|---|---|
| 4,248,504 A | * | 2/1981 | Albertinetti et al. | 359/295 |
| 4,280,756 A | * | 7/1981 | Albernetti | 359/295 |
| 5,096,279 A | * | 3/1992 | Hornbeck et al. | 359/230 |
| 5,444,566 A | | 8/1995 | Gale et al. | |
| 5,757,536 A | * | 5/1998 | Ricco et al. | 359/224 |
| 5,903,383 A | * | 5/1999 | Bernstein et al. | 359/291 |
| 6,123,985 A | * | 9/2000 | Robinson et al. | 427/162 |

FOREIGN PATENT DOCUMENTS

| DE | 4224600 A1 | 1/1994 |
|---|---|---|
| EP | 0769713 A2 | 4/1997 |

* cited by examiner

Primary Examiner—Loha Ben
(74) Attorney, Agent, or Firm—Sughrue Mion, PLLC

(57) ABSTRACT

A micro-mirror device and associated method, the device including a substrate, address electrodes provided on the substrate, and a micro-mirror facing the substrate and spaced a predetermined distance from the substrate. The micro-mirror device is adapted so that the slope of the micro-mirror can be adjusted by electrostatic attraction forces between the address electrodes and the micro-mirror. The micro-mirror device further includes auxiliary electrodes formed on and projected from the substrate. The upper portions of the auxiliary electrodes are disposed in the vicinity of the micro-mirror, so that distances between the micro-mirror and the auxiliary electrodes can remain small, even when the micro-mirror is inclined by electrostatic attraction forces in one direction. Accordingly, restoration of the micro-mirror is enhanced by electrostatic attraction forces of the auxiliary electrodes.

11 Claims, 6 Drawing Sheets

1

MICRO-MIRROR DEVICE AND DRIVING METHOD

BACKGROUND OF THE INVENTION

1. Field of the Invention

The present invention relates to a micro-mirror device and an associated method, the device adapted so as to change the reflection path of an incident light beam by pivoting a micro-mirror using electrostatic attraction forces. More particularly, the present invention relates to a micro-mirror device and an associated method, the device having an improved structure for restoring the micro-mirror skewed by electrostatic attraction forces to its original position.

2. Description of the Related Art

A general micro-mirror device array is an array in which a plurality of micro-mirrors are installed so as to be pivoted by electrostatic attraction forces, and to reflect incident light beams at different reflection angles depending on pivoting angles or directions. Applications of micro-mirror device arrays include an image displaying apparatus of a projection television and various laser scanning devices such as a scanner, copier, or facsimile machine. In particular, when a micro-mirror device array is employed in an image displaying apparatus, in the micro-mirror device array, micro-mirrors 1 corresponding to the number of required pixels are arranged in an array in a two-dimensional plane, as shown in FIG. 1. The micro-mirrors 1 arranged in an array, so as to correspond to respective pixels as described above are independently pivoted according to an image signal, decide respective reflection angles of incident light beams, and, therefore, can form an image.

Such micro-mirror devices are disclosed in, for example, U.S. Pat. No. 5,331,454 entitled "LOW RESET VOLTAGE PROCESS FOR DMD" issued Jul. 19, 1994 and assigned to Texas Instruments Incorporated, and U.S. Pat. No. 5,535,047 entitled "ACTIVE YOKE HIDDEN HINGE DIGITAL MICROMIRROR DEVICE" issued Jul. 9, 1996 and assigned to Texas Instruments Incorporated.

Briefly, as shown in FIG. 2, each of the disclosed micro-mirror devices comprises a substrate 11, first and second address electrodes 13 and 14 provided on the substrate 11, and a micro-mirror disposed to be spaced from and facing the first and second address electrodes 13 and 14.

In the disclosed micro-mirror devices, the micro-mirror 15 is installed on the substrate 11 by means of at least one elastically deformable hinge or post so as to be pivotable, and is maintained in a horizontal position by an elastic restoring force. As the structure of such a hinge or post is described in the above-mentioned inventions, a detailed description thereof is omitted.

In the micro-mirror device having the structure as described above, when respective voltages are applied to the first and second address electrodes 13 and 14 and the micro-mirror 15, the micro-mirror 15 is inclined by electrostatic attraction forces formed according to the differences in electric potentials between the first address electrode 13 and the micro-mirror 15 and between the second address electrode 14 and the micro-mirror 15 to the side having the larger electric potential difference. However, the electrostatic attraction forces must overcome the strength of the hinge or post which tends to keep the micro-mirror in the horizontal position.

That is, as shown in FIG. 3, when voltages V1 and V2 applied to the first and second address electrodes 13 and 14, and voltage V3 applied to the micro-mirror 15 all are zero (0), the micro-mirror 15 is maintained in a horizontal position. Therefore, the distance r1 between the first electrode 13 and the micro-mirror 15 and the distance r2 between the second electrode 14 and the micro-mirror 15 are the same.

On the other hand, when voltages V1, V2, and V3 applied to the first and second address electrodes 13 and 14 and the micro-mirror 15, respectively, have the relationship of V1<V2<V3, the electrostatic force F1 acting between the first address electrode 13 and the micro-mirror 15 is greater than the electrostatic force F2 acting between the second address electrode 14 and the micro-mirror 15, as shown in FIG. 4. Accordingly, the micro-mirror 15 is pivoted toward the first address electrode 13 side of the substrate 11, and is inclined to a position where the electrostatic force F1 is balanced by the sum of the electrostatic force F2 and a restoring force of the hinge or post, such that the condition of r1<r2 is satisfied.

The position of the micro-mirror can also be changed from the position shown in FIG. 4 to the position shown in FIG. 3, or to a position where the micro-mirror is inclined to a direction opposite to the position shown in FIG. 4. These operations of the micro-mirror device are described as follows.

First, when voltages V1, V2, and V3 which all are zero (0) are applied to the first and second address electrodes 13 and 14, and the micro-mirror 15, the position of the micro-mirror 15 changes to the position shown in FIG. 3 under the restoring force of the hinge or post which tends to maintain the micro-mirror in a horizontal position. In this case, since the dimensions of the hinge or post are on the order of □m, the strength of the hinge is relatively weak with respect to torque, and the restoring force of the hinge is very weak. Therefore, the time required to change the position of the micro-mirror is longer than the desired time for driving the micro-mirror device, creating a problem in that the micro-mirror device cannot be driven at high speed.

Next, when voltages V1, V2, and V3 which have the relationship of V2<V1<V3 are applied to the first and second address electrodes 13 and 14 and the micro-mirror 15, respectively, and the micro-mirror 15 is driven to be inclined in the opposite direction, the position of the micro-mirror 15 is changed by the restoring force of the hinge or post and electrostatic forces. In this case, when electrostatic forces F1 and F2 are compared to each other, the fact that the difference between voltages V2 and V3 exceeds the difference between voltages V2 and V3 does not always mean that the electrostatic force F2 is greater than the electrostatic force F1. The reason is that the electrostatic forces F1 and F2 are inversely proportional to respective squares of distances r1 and r2 between the first and second address electrodes 13 and 14 and the micro-mirror 15. Therefore, in this case, until distances r1 and r2 become similar to each other due to the restoring force of the hinge, the effect of reducing the time required to change the position of the micro-mirror 15 by applying voltages having reversed values is insignificant.

Therefore, the micro-mirror device having the structure as described above requires a relatively long time to change the position of a micro-mirror by forming electrostatic attraction forces. Consequently, the driving speed of the micro-mirrors is limited.

SUMMARY OF THE INVENTION

To solve the above problem, it is an objective of the present invention to provide a micro-mirror device and an associated method, the device having improved electrode structures, so that the time required to change the position of a micro-mirror, for example, to change from an inclined position of the micro-mirror to an initial position of the micro-mirror, or to an oppositely inclined position of the micro-mirror, can be reduced.

Accordingly, to achieve the above objective, the present invention provides a micro-mirror device including a substrate, address electrodes being provided on the substrate, and a micro-mirror facing the substrate and spaced a predetermined distance from the substrate. The micro-mirror is adapted so that the slope of the micro-mirror can be adjusted by electrostatic attraction forces between the address electrodes and the micro-mirror. The micro-mirror device includes auxiliary electrodes that are formed on and projected from the substrate and the upper portions of which are disposed in the vicinity of the micro-mirror so that restoring force and restoring speed can be enhanced by electrostatic forces of the auxiliary electrodes when an inclined micro-mirror is restored.

BRIEF DESCRIPTION OF THE DRAWINGS

The above objective and advantage of the present invention will become more apparent by describing in detail preferred embodiments thereof with reference to the attached drawings, in which.

DETAILED DESCRIPTION OF THE PREFERRED EMBODIMENTS

Figure 1:
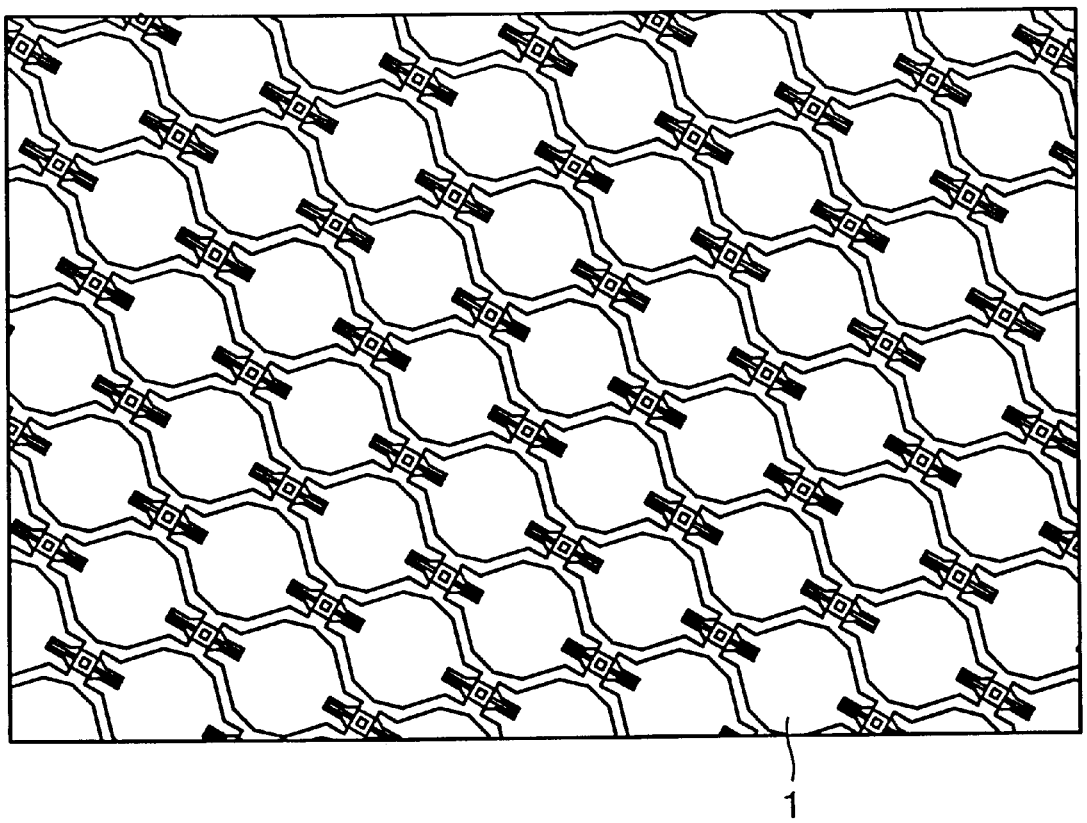
FIG. 1 is a schematic plan view illustrating a conventional micro-mirror device array for an image displaying apparatus.
Figure 2:
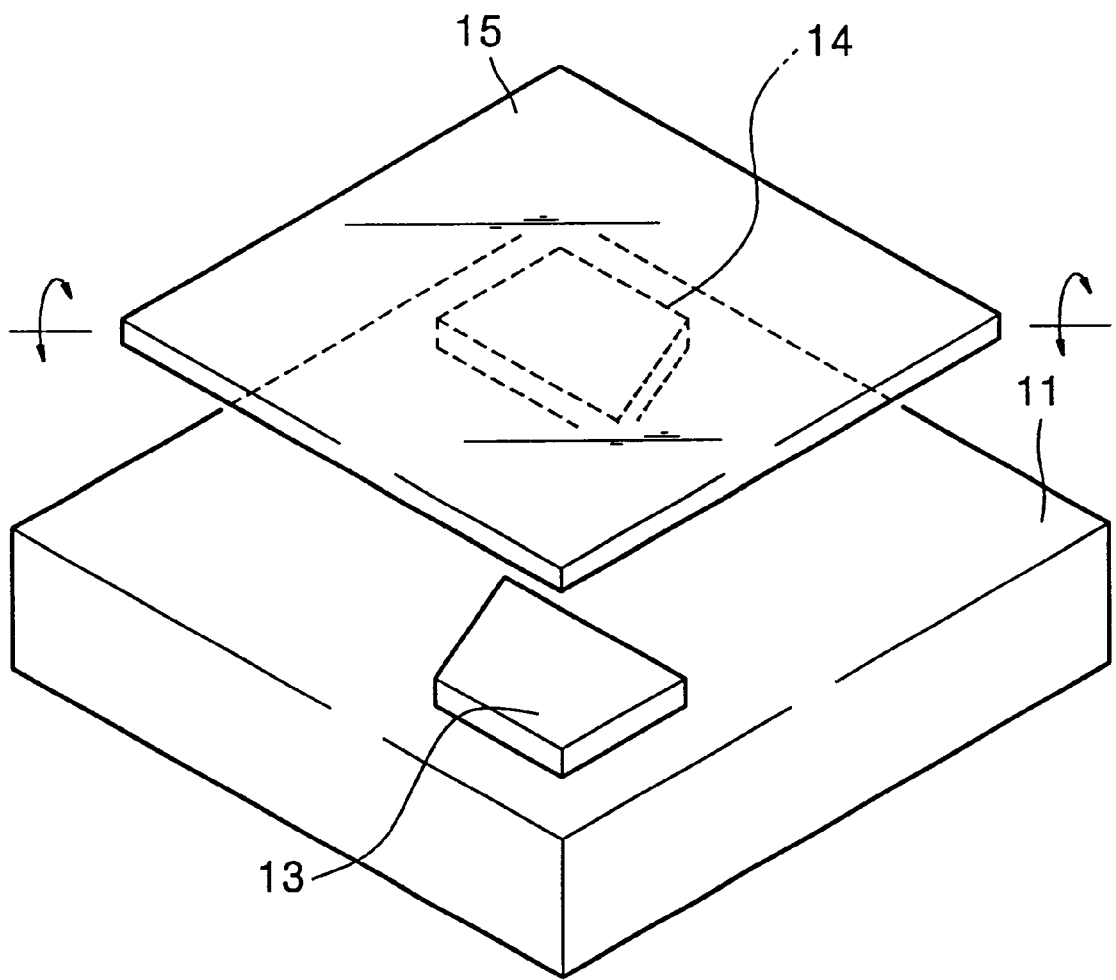
FIG. 2 is a schematic perspective view illustrating a conventional micro-mirror device.
Figure 3:
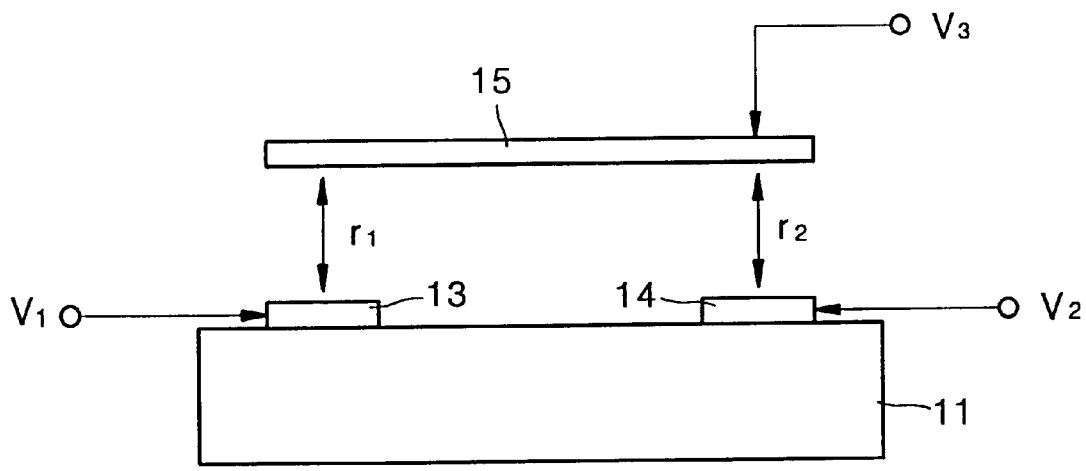
FIGS. 3 and 4 are schematic side views for describing the operation of the conventional micro-mirror device.
Figure 4:
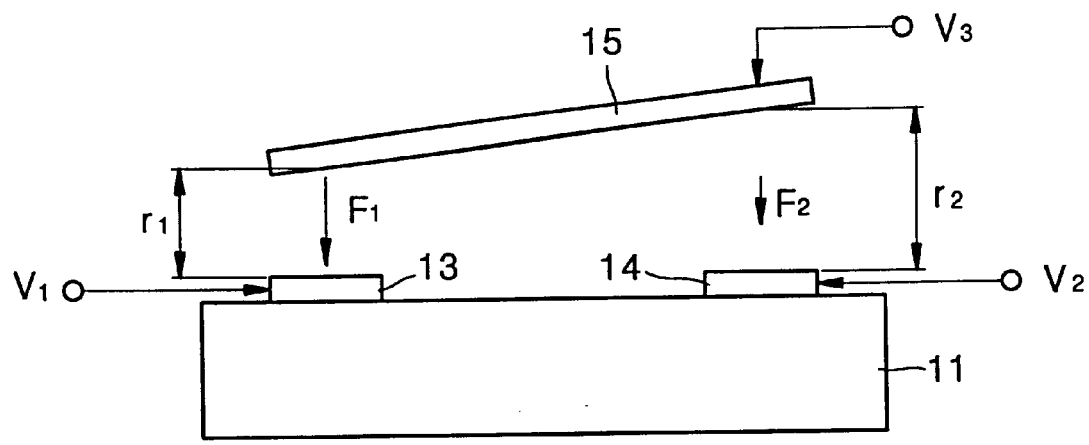
Figure 5:
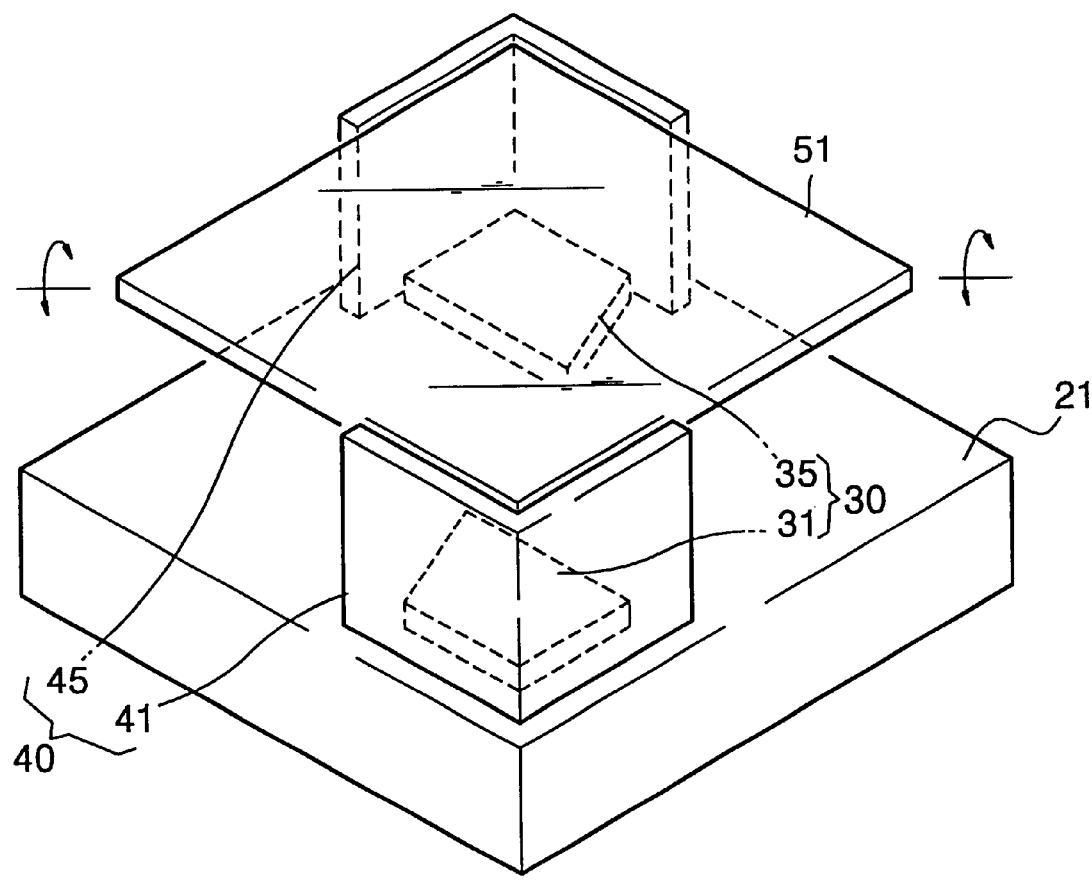
FIG. 5 is a schematic perspective view illustrating a micro-mirror device of an image displaying apparatus according to an embodiment of the present invention.

Referring to FIG. 5, a micro-mirror device according to an embodiment of the present invention comprises a substrate 21, electrodes provided on the substrate 21, and a micro-mirror 51 disposed to be spaced from and facing the electrodes. The micro-mirror 51 is installed to be pivoted above the substrate 21 by electrostatic attraction forces between the electrodes and the micro-mirror 51. The micro-mirror 51 is made pivotable by a hinge (not shown) or post (not shown).

The electrodes comprise a plurality of address electrodes 30 disposed on the substrate 21, facing the micro-mirror 51, and a plurality of auxiliary electrodes 40 disposed on the substrate 21 in the vicinity of the address electrodes 30, projecting toward the micro-mirror 51.

The address electrodes 30 include first and second address electrodes 31 and 35 provided on the substrate 21, spaced a predetermined distance from each other and independently supplied with electric power.

The auxiliary electrodes 40 are provided in the vicinity of the first and second address electrodes 31 and 35, respectively, and include first and second auxiliary electrodes 41 and 45 each of which has one end projecting beyond the micro-mirror 51, and each of which is independently supplied with electric power. Here, the first address electrode 31 and the first auxiliary electrode 41 may be independently or simultaneously supplied with electric power, and the second address 35 and the second auxiliary electrode 45 are supplied with electric power in a similar manner. In addition, the first and second auxiliary electrodes 41 and 45 are formed vertically around the outside of the first and second address electrodes 31 and 35, respectively, and each is corner shaped. In this configuration, because distances between the first and second auxiliary electrodes 41 and 45 and the micro-mirror are small and the effective surfaces of the first and second auxiliary electrodes 41 and 45 are large, electrostatic attraction forces between the first and second auxiliary electrodes 41 and 45 and the micro-mirror 51 can be strengthened.

The first and second auxiliary electrodes 41 and 45 are formed to project beyond the micro-mirror 51 as described above so that when the micro-mirror 51 is inclined in a direction, for example, toward the first auxiliary electrode 41, the distance between the opposite auxiliary electrode, i.e., the second auxiliary electrode 45 and the micro-mirror 51 can be kept small. Therefore, when the micro-mirror 51 is restored to its original position, the restoring speed of the micro-mirror 51 can be enhanced by, in addition to the restoring force of the hinge or post, an electrostatic attraction force between the second auxiliary electrode 45 and the micro-mirror 51. In this case, by applying electric power to the second address electrode 35, the restoring speed can be enhanced by an electrostatic attraction force between the second address electrode 35 and the micro-mirror 51.

The operation of the micro-mirror device having the structure as described above will be described with reference to FIGS. 6 and 7 as follows.

Figure 6:
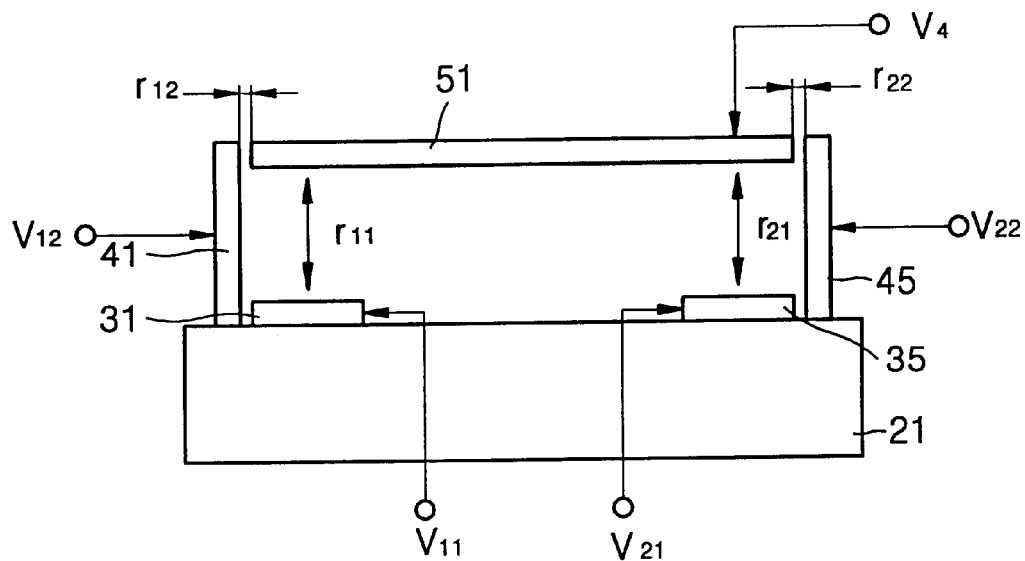
FIGS. 6 and 7 are schematic side views for describing the operation of the micro-mirror device shown in FIG. 5.

FIG. 6 depicts the micro-mirror 51 maintained in a horizontal position. In FIG. 6, voltages V11 and V21 applied to the first and second address electrodes 31 and 35, respectively, voltages V12 and V22 applied to the first and second auxiliary electrodes 41 and 45, respectively, and voltage V4 applied to the micro-mirror all are zero (0). Therefore, the micro-mirror 51 is maintained in a horizontal state by the strength of the hinge or post. Consequently, distances r11 and r21 between the first and second address electrodes 31 and 35 and the micro-mirror 51 are the same. Also, distances r12 and r22 between the first and second auxiliary electrodes 41 and 45 and the micro-mirror 51 are the same. Here, the distances r12 and r22 are much smaller than the distances r11 and r21, and even when the micro-mirror 51 is inclined, the distances r12 and r22 remain smaller than the distances r11 and r21 when the micro-mirror 51 is in a horizontal state.

Figure 7:
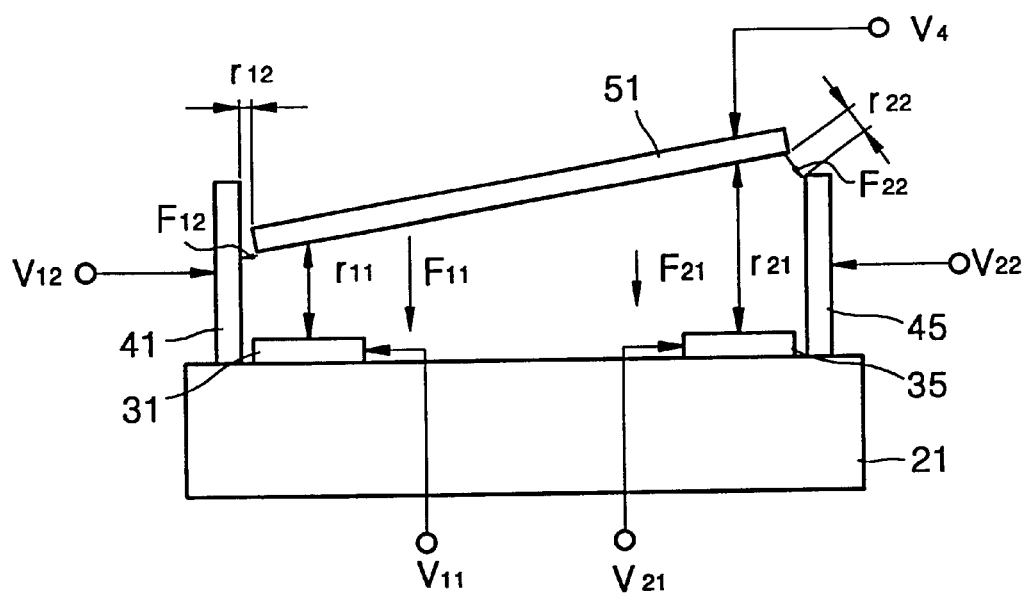

On the other hand, when voltages V11, V21, and V4 applied to the first and second address electrodes 31 and 35 and the micro-mirror 51 have the relationship, V11<V21<V4, the electrostatic force F11 acting between the first address electrode 31 and the micro-mirror 51 is greater than the electrostatic force F21 acting between the second address electrode 35 and the micro-mirror 51, as shown in FIG. 7. Accordingly, the micro-mirror 51 rotates toward the first address electrode 31 side of the substrate 21, and is inclined to a position where the electrostatic force F11 is balanced by the sum of the electrostatic force F21 and the restoring force of the hinge or post, such that the condition of r11<r21 is satisfied. Here, voltages V12 and V22 are applied to the first and second auxiliary electrodes 41 and 45 and voltage V4 is applied to the micro-mirror 51 so that the voltages V12, V22, and V4 have the relationship V12<V22<V4. When voltages V12 and V22 are applied as above, the voltages V12 and V22 are the same voltages applied to the first and second address electrodes 31 and 35, respectively. In this case, the first address electrode 31 and the first auxiliary electrode 41, and the second address electrode 35 and the second auxiliary electrode 45 are integrally formed, respectively.

In addition, when voltages V11, V21, and V4 applied to the first and second address electrodes 31 and 35 and the micro-mirror 51 respectively, have the relationship of V11>V21>V4, the result as shown in FIG. 7 can also be obtained.

The position of the micro-mirror 51 can also be changed from the position shown in FIG. 7 to the position shown in FIG. 6, or to a position where the micro-mirror 51 is inclined in a direction opposite to the position shown in FIG. 7. These operations of the micro-mirror device are described as follows.

Voltages V12, V22, and V4 which have the relationship of V22<V12<V4 are applied to the first and second auxiliary electrodes 41 and 45 and the micro-mirror 51, respectively, so that the micro-mirror 51 is driven to be inclined in the opposite direction. In this case, the position of the micro-mirror 51 is changed by the restoring force of the hinge or post, which supports the micro-mirror 51, and by electrostatic forces. In this case, because distances r12 and r22 between the first and second auxiliary electrodes 41 and 45 and the micro-mirror 51 are very short, and the difference between V22 and V4 exceeds the difference between V12 and V4, the electrostatic force F22 is greater than the electrostatic force F12. The time required to change the position of the micro-mirror 51 using the electrostatic attraction force between the first and second auxiliary electrodes 41 and 45 and the micro-mirror 51 can be reduced, as above.

In addition, when the slope of the micro-mirror 51 is to be changed, desired voltages, i.e., voltages V11 and V21 which have the relationship V21<V11<V4 are applied to the first and second address electrodes 31 and 35, respectively, so that the micro-mirror 51 is driven to be inclined in a direction opposite to the direction of inclination shown in FIG. 7. In this case, because electrostatic attraction forces between the first and second auxiliary electrodes 41 and 45 and the micro-mirror 51 act in addition to the electrostatic attraction forces between the first and second address electrodes 31 and 35 and the micro-mirror 51, the time required to change the position of the micro-mirror 51 can be further reduced. Here, voltages applied to the first address electrode 31 and the first auxiliary electrode 41 can be the same, and voltages applied to the second address electrode 35 and the second auxiliary electrode 45 can also be the same.

In addition, when the micro-mirror 51 is operated and restored, sequential application of voltages to the first and second auxiliary electrodes 41 and 45 and the first and second address electrodes 31 and 35 is possible.

Figure 8:
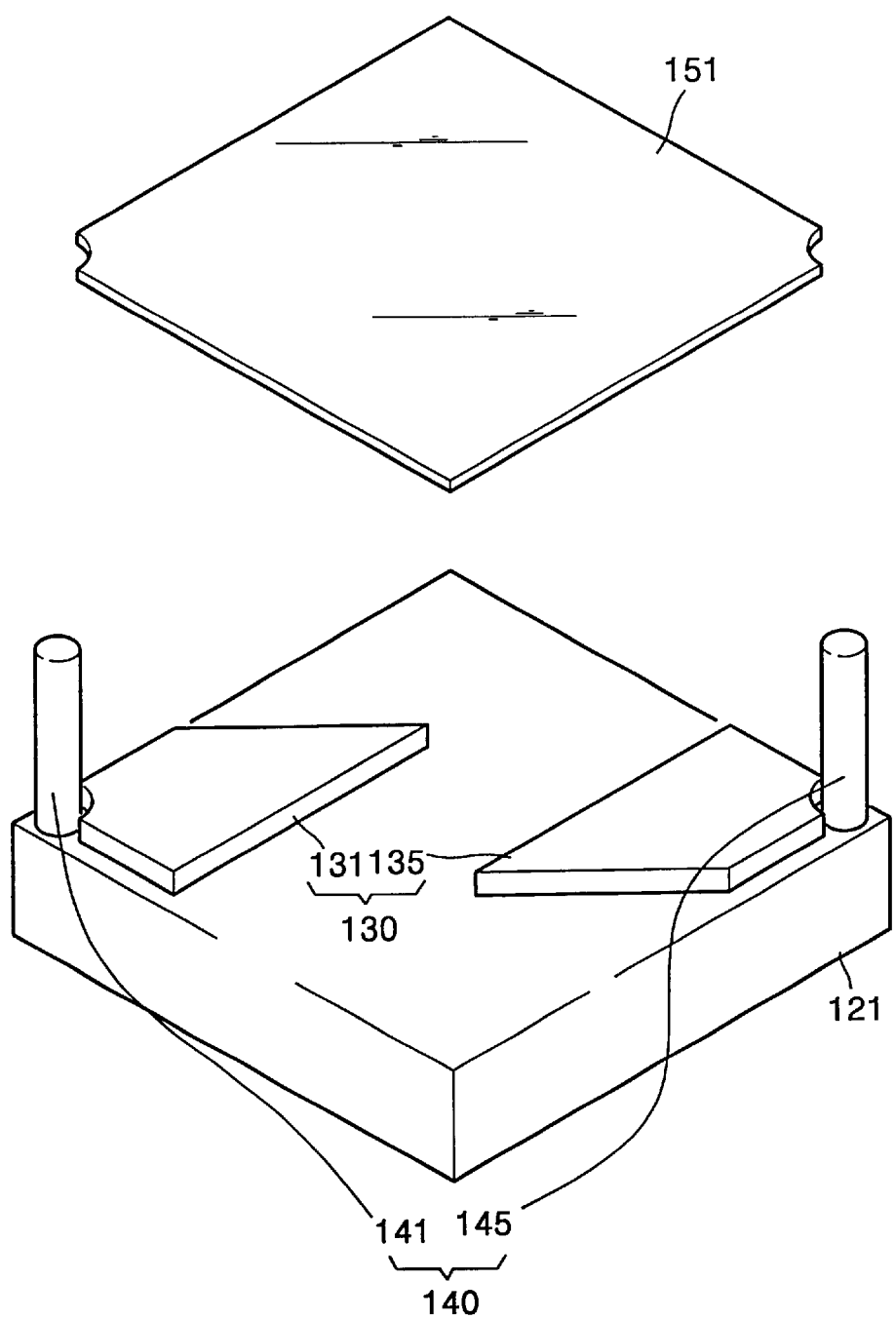
FIG. 8 is an exploded perspective view illustrating a micro-mirror device of an image displaying apparatus according to another embodiment of the present invention.

Referring to FIG. 8, a micro-mirror device according to another embodiment of the present invention comprises a substrate 121, electrodes provided on the substrate 121, and a micro-mirror 151 supported by a hinge or post on the substrate 121 so as to be spaced a predetermined distance from the substrate 121. The electrodes comprise address electrodes 130 disposed on the substrate 121 and spaced a predetermined distance from each other, and auxiliary electrodes 140 disposed on the substrate 121 in the vicinity of the address electrodes 130, projecting toward the micro-mirror 151. In this embodiment, the address electrodes 130 include first and second address electrodes 131 and 135 driven independently of each other and spaced a predetermined distance from each other. In addition, the auxiliary electrodes 140 include first and second auxiliary electrodes 141 and 145 provided in the vicinity of the first and second address electrodes 131 and 135, respectively, for enhancing the restoring speed of the inclined micro-mirror 151 by electrostatic attraction forces. Here, because the substrate 121, the first and second address electrode 131 and 135, and the micro-mirror 151 are substantially the same as members described with reference to FIGS. 5 through 7, detailed descriptions thereof are omitted.

This embodiment differs from the micro-mirror device according to the previously described embodiment in that the first and second auxiliary electrodes 141 and 145 have a cylindrical shape or a polygonal pillar shape. When the first and second auxiliary electrodes 141 and 145 are provided as above, electrostatic attraction forces can be reinforced without markedly lowering the efficiency of utilizing light, since the spaces occupied by the first and second auxiliary electrodes 141 and 145 are small, and, therefore, most of an incident beam can travel to the micro-mirror 151.

Since the micro-mirror device having the structure described above is provided with auxiliary electrodes disposed in the vicinity of the respective address electrodes and projected toward the micro-mirror, the restoring speed of an inclined micro-mirror can be enhanced by electrostatic attraction forces between the auxiliary electrodes and the micro-mirror, and, therefore, the micro-mirror device can be widely utilized in image displaying apparatuses requiring high response speed.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A micro-mirror device comprising:

a substrate;

a plurality of address electrodes provided on the substrate;

at least one micro-mirror facing the substrate and spaced a predetermined distance from the substrate having a slope that is adjustable by electrostatic attraction forces between said address electrodes and said micro-mirror; and a plurality of auxiliary electrodes formed on and projected from the substrate and having upper portions that are disposed in a vicinity of said micro-mirror, wherein restoring force and restoring speed are enhanced by electrostatic forces of the auxiliary electrodes during restoration of an inclined micro-mirror.

2. The micro-mirror device as claimed in claim 1, wherein the plurality of address electrodes comprises first and second address electrodes provided on the substrate and spaced a predetermined distance from each other, and the plurality of auxiliary electrodes comprises first and second auxiliary electrodes provided in the vicinity of the first and second address electrodes, respectively, and formed to project beyond the micro-mirror, and further wherein the first and second auxiliary electrodes enhance the restoring speed of the micro-mirror by a first and a second auxiliary electrostatic attraction force, respectively, during restoration of the micromirror after being inclined by a first electrostatic attraction force between the first address electrode and the micro-mirror and after being inclined by a second electrostatic attraction force between the second address electrode and the micro-mirror, respectively.

3. The micro-mirror device as claimed in claim 2, wherein the first and second auxiliary electrodes are shaped in the form of vertically erected plates.

4. The micro-mirror device as claimed in claim 2, wherein the first and second auxiliary electrodes are cylindrically shaped.

5. The micro-mirror device as claimed in claim 2, wherein the first and second auxiliary electrodes are shaped in the form of polygonal pillars.

6. The micro-mirror device as claimed in claim 2, wherein a first voltage is applied to the first address electrode and to the first auxiliary electrode, when the position of the micro-mirror is changed.

7. The micro-mirror device as claimed in claim 6, wherein the first address electrode and the first auxiliary electrode are integrally formed.

8. The micro-mirror device as claimed in claim 2, wherein a second voltage is applied to the second address electrode and to the second auxiliary electrode, when the position of the micro-mirror is changed.

9. The micro-mirror device as claimed in claim 8, wherein the second address electrode and the second auxiliary electrode are integrally formed.

10. A method of driving a micro-mirror device to rotate from a horizontal position to an inclined position and to restore the micro-mirror device to the horizontal position, said method comprising:

applying a first address voltage (V11) to a first address electrode provided on a substrate;

applying a second address voltage (V21) to a second address electrode provided on the substrate and spaced a predetermined distance from the first address electrode;

applying a first mirror voltage (V41) to a micro-mirror facing the substrate and spaced a predetermined distance from the substrate, such that the micro-mirror device rotates toward the inclined position;

applying a first auxiliary voltage (V12) to a first auxiliary electrode formed on and projected from the substrate and having upper portions that are disposed in a vicinity of the micro-mirror;

applying a second auxiliary voltage (V22) to a second auxiliary electrode formed on and projected from the substrate and having upper portions that are disposed in a vicinity of the micro-mirror; and applying a second mirror voltage (V42) to the micro-mirror, such that the micro-mirror device rotates toward the horizontal position.

11. The method of driving a micro-mirror device as claimed in claim 10, wherein the voltages V11, V21, and V41 have a relationship V11<V21<V41 causing the micro-mirror device to rotate toward a first electrode side of the substrate, and wherein the voltages V22, V12, and V42 have a relationship V22<V12<V42 causing the micro-mirror device to rotate toward the horizontal position.

* * * * *